US005390692A

United States Patent [19]

Jones et al.

[11] Patent Number: 5,390,692

[45] Date of Patent: Feb. 21, 1995

[54] VALVE

[75] Inventors: Alan G. Jones, Gloucestershire; Roger W. Harris, Cheltenham, both of England

[73] Assignee: Lucas Industries, England

[21] Appl. No.: 191,641

[22] Filed: Feb. 4, 1994

[30] Foreign Application Priority Data

Feb. 10, 1993 [GB] United Kingdom ................. 9302566

[51] Int. Cl.[6] ........................ F16K 21/02; F02M 39/00

[52] U.S. Cl. ................................. 137/513.3; 123/467; 123/506

[58] Field of Search ...................... 137/513.3; 123/467, 123/506

[56] References Cited

U.S. PATENT DOCUMENTS

| | | | |
|---|---|---|---|
| 2,243,011 | 5/1941 | L'Orange | 137/513.3 X |
| 2,352,322 | 6/1944 | Hoffer | 137/514.5 |
| 2,503,458 | 4/1950 | Thaheld | 137/513.3 X |
| 3,387,597 | 6/1968 | Wirsching | 123/506 X |
| 3,510,062 | 5/1970 | Waldman | 239/96 |
| 3,625,638 | 12/1971 | Koster et al. | 137/513.3 X |
| 3,992,898 | 11/1976 | Duell et al. | 137/513.3 X |
| 4,074,668 | 2/1978 | Indra | 123/506 X |
| 4,467,767 | 8/1984 | Kampichler et al. | 123/467 |
| 4,627,571 | 12/1986 | Kato et al. | 123/467 X |
| 4,628,957 | 12/1986 | Höfer et al. | 123/467 X |
| 4,648,369 | 3/1987 | Wannenwetsch | 123/467 |
| 5,156,132 | 10/1992 | Iwanaga | 123/467 X |

FOREIGN PATENT DOCUMENTS

| | | |
|---|---|---|
| 0418800 | 9/1990 | European Pat. Off. . |
| 4037465 | 11/1990 | Germany . |

*Primary Examiner*—John Rivell

*Attorney, Agent, or Firm*—Andrus, Sceales, Starke & Sawall

[57] ABSTRACT

A valve for incorporation between a fuel injection nozzle and the pumping chamber of a spill type fuel injection pump includes a valve member slidable in a cylinder. The ends of the cylinder are connected to the nozzle and pumping chamber respectively and formed in the cylinder is a seating. The valve member is biased by a spring into engagement with the seating and a flow path exists between the end of the cylinder connected to the nozzle and a position in the cylinder upstream of the seating considered in the direction of fuel flow to the nozzle. The valve also includes an orifice interconnecting the ends of the cylinder.

3 Claims, 1 Drawing Sheet

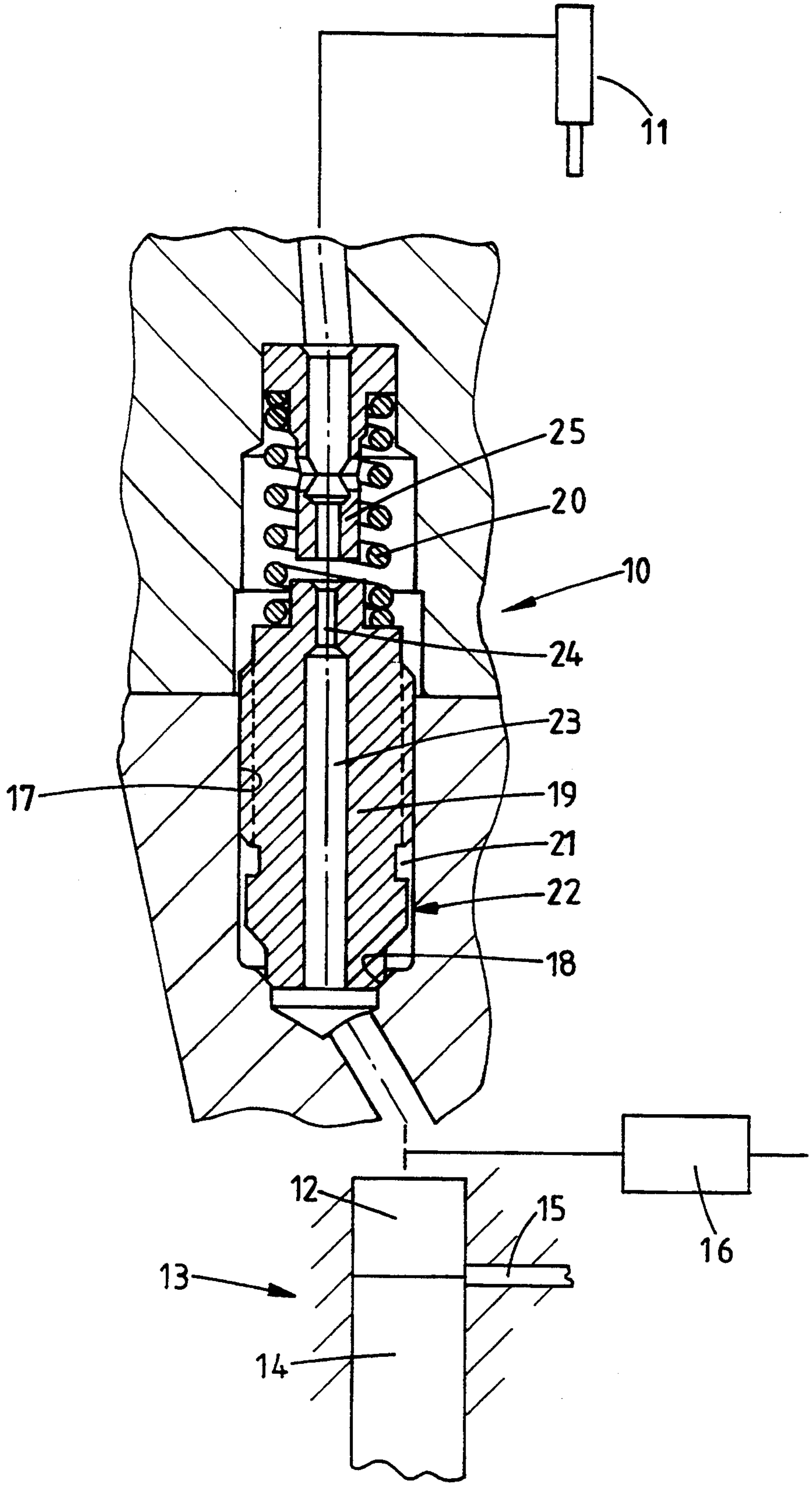
11
25
20
10
24
23
17
19
21
22
18
12
15
16
13
14

VALVE

This invention relates to a valve for incorporation in a fuel delivery line extending between the pumping chamber of a spill type fuel injection pump and an injection nozzle which incorporates a fuel pressure actuated valve member.

It is known to incorporate in the delivery line of such a pump a conventional unloading seated delivery valve and in series therewith a so called snubber valve. The action of the delivery valve is to unload a predetermined volume of fuel from the delivery line at the termination of delivery of fuel from the pumping chamber, prior to closure of the valve. The action of the snubber valve is to damp the return flow of fuel so as to minimise the risk of cavitation. When the delivery valve has closed the fuel remaining in the delivery line is pressurised to a level which is below the nozzle closing pressure but is above the residual pressure in the pumping chamber.

In spite of the presence of the snubber valve it has been found that cavities can form in the delivery line between the valves and the nozzle and in the nozzle itself and the collapse of the cavities can cause erosion of the pipeline which forms the delivery line and also the nozzle.

The object of the invention is to provide a valve for the purpose specified in a simple and convenient form.

According to the invention a valve for the purpose specified comprises a cylinder one end of which in use is connected to the pumping chamber and the other end to the fuel injection nozzle, a seating defined in the cylinder, a valve member slidable in the cylinder, resilient means biasing the valve member into engagement with the seating, an orifice through which communication is established between the ends of the cylinder so as to afford constant communication between the pumping chamber and the injection nozzle and a flow path interconnecting the other end of the cylinder with a position in the cylinder downstream of the seating considered in the direction of fuel flow to the nozzle.

An example of a valve in accordance with the invention will now be described with reference to the accompanying drawing which shows a sectional side elevation of the valve shown connected into a fuel system.

Referring to the drawing the valve is shown diagrammatically at 10 and is connected in the pipeline intermediate a fuel injection nozzle 11 and the pumping chamber 12 of a spill type fuel injection pump 13. The injection pump 13 includes a plunger 14 movable inwardly by the action of an engine driven cam, the plunger being housed within a cylinder in the wall of which is formed a fuel inlet port 15 which is connected to a source of fuel under pressure. Also connected with the pumping chamber is a spill valve 16 which may be electromagnetically operated.

In use, during inward movement of the plunger 14 and following closure of the port 15, the fuel in the pumping chamber 12 will be pressurised and if the spill valve 16 is closed, will be supplied by way of the valve 10, to the injection nozzle 11. The injection nozzle incorporates a fuel pressure actuated valve member and when the pressure rises to the so called nozzle opening pressure, the valve member will lift from a seating to permit fuel flow into a combustion space of the associated engine. The fuel flow will continue for so long as the plunger 14 is being moved inwardly and whilst the valve 16 is closed. If during the inward movement of the plunger the valve 16 is opened, the pressure of fuel in the pumping chamber will fall and the valve member in the fuel injection nozzle will close to terminate delivery of fuel to the associated engine. During continued inward movement of the plunger, the fuel displaced from the pumping chamber 12 will flow by way of the valve 16 to a drain which may be the low pressure source of fuel which is connected to the inlet port 15. During the outward movement of the plunger 14 fuel will flow into the pumping chamber 12 by way of the port 15 once the latter is uncovered by the plunger.

The valve 10 comprises a cylinder 17 one end of which is connected to the pumping chamber 12 and the other end of which is connected to the nozzle 11. At the one end of the cylinder is formed an annular seating 18 and slidable in the cylinder is a cylindrical valve member 19. The end portion of the valve member directed towards the one end of the cylinder, is shaped to cooperate with the seating 18 and the valve member is biased by a spring 20 into engagement with the seating. Formed in the periphery of the valve member is a circumferential groove 21 and that portion of the valve member which extends between the groove towards the other end of the cylinder, is fluted so as to guide the movement of the valve member. The portion of the valve member which extends between the groove 21 and the one end of the cylinder includes a cylindrical portion 22 and an inwardly directed portion extending to the portion of the valve member which is shaped for cooperation with the seating.

Formed in the valve member and placing the opposite ends of the cylinder in communication with each other is a passage 23 which incorporates a restricted orifice. The orifice is formed by a drilling 24 having a coned entry from the adjacent end of the valve member. The cylindrical portion 22 is smaller in diameter than the cylinder 17 to form a flow path which when the valve member is lifted from the seating, places the opposite ends of the cylinder in communication with each other.

In use, when during inward movement of the plunger, the port 15 is closed and the valve 16 closed the fuel entering the one end of the cylinder will urge the valve member 19 from the seating against the action of the spring 20. The maximum movement of the valve member is determined by a stop 25 mounted in the other end of the cylinder. The main flow of fuel to the nozzle 11 takes place along the flow path defined between the cylindrical portion 22 of the valve member and the wall of the cylinder, the remaining flow taking place through the passage 23 and the orifice 24.

When the spill valve 16 is opened the pressure in the pumping chamber 12 falls and the valve member 19 returns to the seating under the action of the spring 20 and the fuel pressure in the pipeline connecting the valve with the nozzle. The rate at which the valve member returns to the seating depends upon a number of factors such as the spring rate and load, the size of the orifice formed by the passage 24 and the area of the flow path and it is arranged that once the valve member engages the seating it remains in engagement therewith. When the valve member is in engagement with the seating the aforesaid flow path is closed. However, the pressure in the pipeline continues to fall by reason of the orifice and the rate of fall of pressure to that prevailing in the pumping chamber 12, is controlled by careful choice of the size of the orifice, in order to reduce the risk of cavities in the pipeline and the nozzle. Prior to each delivery of fuel through the injection the fuel pressure in the pipeline and the passages in the nozzle is at a low value as determined by the pressure of the source of fuel.

In a typical example, the passage 24 has a diameter of 1.5 mm the diameter of the cylinder 17 is 15.0 mm and the diameter of the cylindrical portion 22 of the valve member is 13.14 mm.

We claim:

1. A valve for incorporation in a fuel delivery line extending between the pumping chamber of a spill type fuel injection pump and a fuel injection nozzle, the valve comprising a cylinder having one end connected to the pumping chamber and its other end connected to the nozzle, a seating defined in the cylinder adjacent said one end thereof, a valve member slidable within the cylinder, the valve member being shaped at one end for engagement with the seating, a portion of the valve member being fluted to guide the movement of the valve member, said valve member intermediate its ends defining a cylindrical portion having a clearance with the wall of the cylinder, a passage formed in the valve member and an orifice therein, said passage and orifice affording constant communication between the opposite ends of the cylinder, and said clearance forming a flow path connecting the ends of the cylinder independently of said passage and orifice when the valve member is lifted from the seating by the action of fuel under pressure flowing from the pumping chamber.

2. A valve according to claim 1 including a stop positioned at said other end of the cylinder to limit the movement of the valve member away from the seating.

3. A valve according to claim 1 in which the diameter of the cylinder is 15.00 mm and the diameter of said cylindrical portion is 13.14 mm.

* * * * *